No. 857,509. PATENTED JUNE 18, 1907.
A. S. WYSONG.
TRACTION ENGINE.
APPLICATION FILED APR. 7, 1906.
3 SHEETS—SHEET 1.
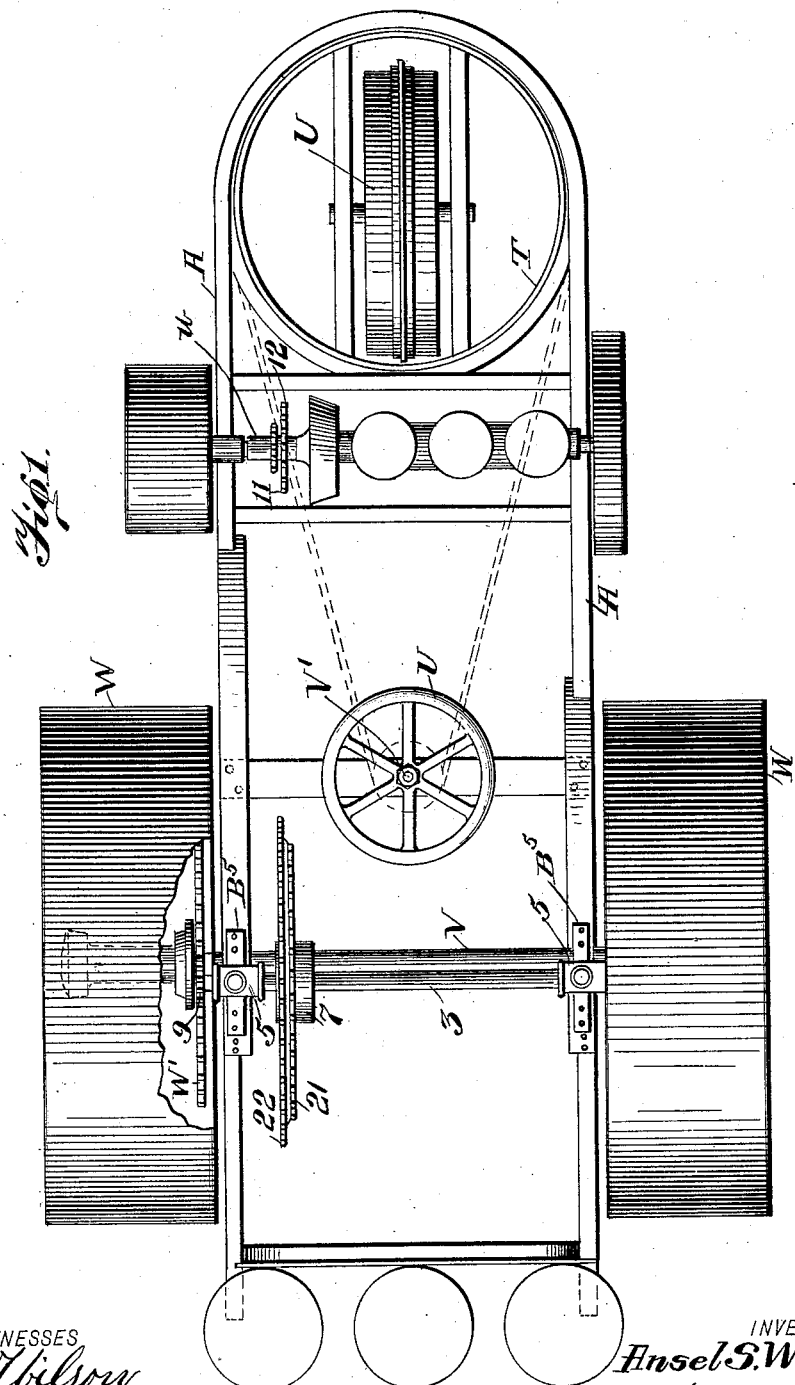
WITNESSES
INVENTOR
Ansel S. Wysong.
BY
ATTORNEYS No. 857,509. PATENTED JUNE 18, 1907.
A. S. WYSONG.
TRACTION ENGINE.
APPLICATION FILED APR. 7, 1906.
3 SHEETS—SHEET 2.
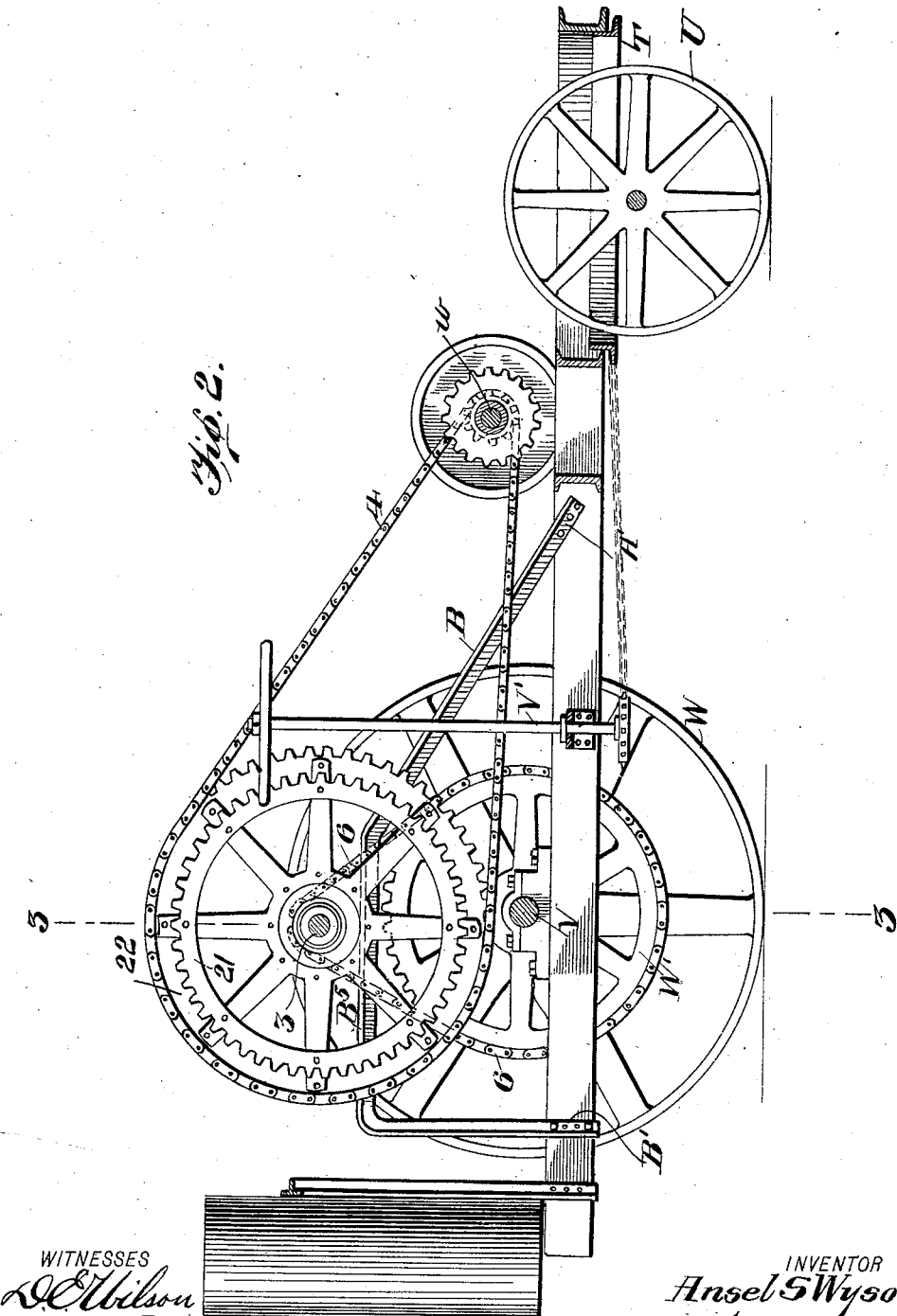

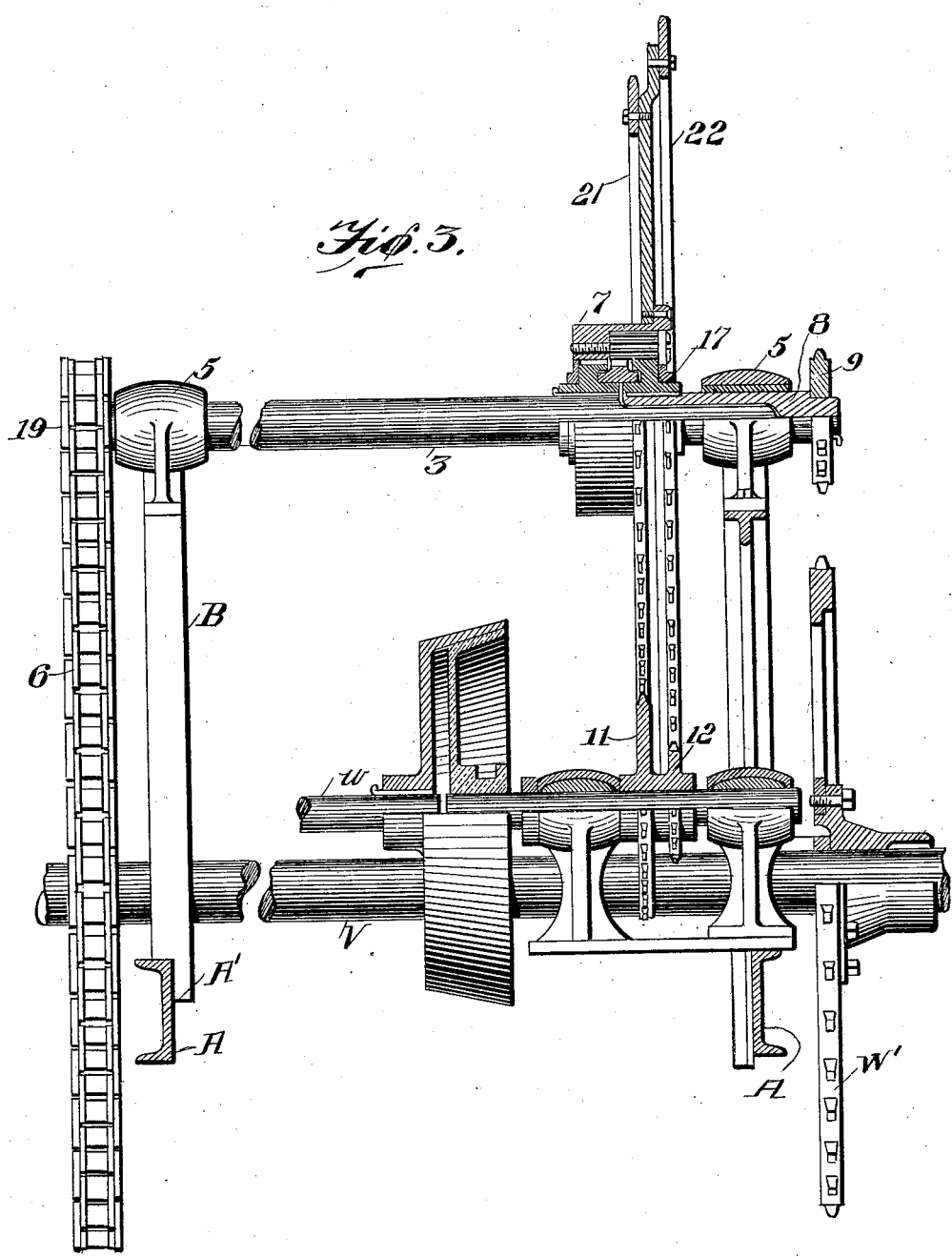

UNITED STATES PATENT OFFICE.

ANSEL S. WYSONG, OF MEADE, KANSAS, ASSIGNOR OF ONE-HALF TO EVAN A. TWIST, OF MEADE, KANSAS.

TRACTION-ENGINE.

No. 857,509.     Specification of Letters Patent.     Patented June 18, 1907.

Application filed April 7, 1906. Serial No. 310,511.

*To all whom it may concern:*

Be it known that I, ANSEL S. WYSONG, a citizen of the United States, and a resident of Meade, in the county of Meade and State of Kansas, have invented certain new and useful Improvements in Traction-Engines, of which the following is a specification.

My invention is an improvement in traction engines or automobiles and consists in certain novel constructions and combinations of parts as will be hereinafter described and claimed.

In the drawings Figure 1 is a top plan view and Fig. 2 is a sectional side elevation of an engine embodying my invention. Fig. 3 is a vertical section on about line 3—3 of Fig. 2, parts being removed and others shown in section.

In carrying out the invention I provide a main frame having side beams A connected at their front ends with a circular track in which turns the turn-table T having the steering wheel U and arranged for operation from the steering shaft V' as will be understood from Figs. 1 and 2 of the drawings. The main frame is provided with suitable bearings for the rear axle V carrying the wheels W as will be understood from Figs. 1 and 2. This main frame may support the engine whose shaft w is shown in Fig. 2, and is arranged to be suitably driven by the engine, which latter may be of any suitable construction, and which may be connected in any suitable manner with the shaft w to drive the same whenever desired.

In connection with the rear axle V and the engine shaft w I employ a countershaft 3 located vertically above the rear axle V and driven from the engine shaft and in turn operating to drive the rear axle as will be more fully described hereinafter.

As best shown in Fig. 3, I provide a double sprocket or large and small sprocket wheels 11, 12, which wheels 11, and 12 drive the countershaft 3 by means of the small and large sprocket wheels 21 and 22 on the countershaft 3. The said small and large sprocket wheels are mounted to turn with the casing 7 which incloses the transmission gear, the said casing turning on the countershaft 3 and coöperating with the transmission gear shown at 17 in driving the shaft 3, or in driving the sleeve 8 thereon, the shaft and sleeve rotating as one member until the differential gear acts, when the sleeve 8 will rotate independently of the shaft 3, as will be understood by those skilled in the art.

The sleeve 8 has the sprocket wheel 9 and the shaft 3 has the sprocket wheel 19, said sprocket wheels 9 and 19 being geared by the chains 6 with the sprocket wheels W' connected with the hubs of their respective wheels W, as will be understood from the drawings.

The chain 4 connecting the sprocket wheels of the engine shaft and countershaft, may be shifted from one pair of sprockets to the other to cause difference in speed ratio as in cone pulley practice, and this chain and the chains 6 may be roller chains or the so-called Morse rocker joint chain or any other form of suitable chain adapted for the purpose.

The countershaft 3 is mounted in bearings on the upright side frames B as shown in Figs. 1 and 2. The frames B are secured at their front ends at A' to the main frame, extend thence upwardly to a point vertically over the rear axle where they extend horizontally for a short distance to form seats $B^5$ for the bearing boxes of the countershaft, and then extend down and are secured adjustably at B' to the main frame, this adjustable connection at B' permitting the frame to be raised and lowered for convenient adjustment of the driving chains 6.

The bearing boxes 5 for the countershaft are secured adjustably upon the horizontal seats $B^5$ so they can be adjusted back and forth for the purpose of adjusting the tension of the chain 4 and this adjustment at $B^5$ may coöperate with the adjustment at B' in securing the proper tension of the chains 4 and 6 in the use of the invention.

The wheels W may turn on or be secured to the axle as may be desired by the purchasers.

Having thus described my invention, what I claim as new and desire to secure by Letters Patent is—

1. The combination substantially as herein described of the main frame, the engine shaft having a clutch sleeve and large and small sprocket wheels thereon, the rear axle, the countershaft above the rear axle, the side frames secured at their front ends to the main frame and extending upwardly and rearwardly therefrom and provided with horizontal seats and with portions depending therefrom and connected adjustably with the main frame, bearing boxes for the countershaft adjustable horizontally along the said seats of the side frames, the sleeve and transmission gear upon the countershaft, said shaft and sleeve being provided with sprocket wheels, and wheels on the rear hubs and geared with the said sprocket wheels of the sleeve and countershaft, the casing inclosing the transmission gear and provided with large and small sprocket wheels, and a chain connecting the sprocket wheels of said casing and of the clutch sleeve on the engine shaft, substantially as and for the purpose set forth.

2. The combination with the main frame and the engine or drive shaft and large and small sprocket wheels thereon, of the rear axle and its wheels, a countershaft, above the axle shaft, side frames supporting the countershaft for the main frame gearing between said countershaft and the wheels of the rear axle, the large and small sprocket wheels upon the countershaft, and a chain connecting the sprocket wheels of the countershaft and of the drive shaft, substantially as set forth.

ANSEL S. WYSONG.

Witnesses:
F. W. CURL,
J. R. GRAVES.